Dec. 15, 1953     C. KRAVAGNA     2,662,724

CHECK VALVE

Filed Dec. 27, 1948

INVENTOR

CUT KRAVAGNA

BY

*Mason & Graham*

ATTORNEYS

Patented Dec. 15, 1953

2,662,724

UNITED STATES PATENT OFFICE 2,662,724

CHECK VALVE

Cut Kravagna, Los Angeles, Calif.

Application December 27, 1948, Serial No. 67,266

1 Claim. (Cl. 251—122)

This invention relates generally to automatic check valves of the type embodying an elastic or resilient normally closed member through which fluid flows in one direction by expanding the member and which is designed to prevent the flow of fluid in the other direction by closing tight under the influence of back pressure or a pressure differential between the inlet and outlet sides of the member when the pressure on the outlet side exceeds that on the inlet side. The invention is an improvement upon the valve shown in the copending application for patent of Clarence B. Walden and Cut Kravagna, Serial No. 678,832, filed June 24, 1946, now Patent No. 2,594,525.

The general object of the invention is to provide an improved seal of the type generally described above and shown in the copending application for patent referred to above.

A particular object of the invention is to provide an improved valve member, the construction of which is such as to positively prevent back flow of fluid where pressure on the outlet side of the valve exceeds the inlet pressure.

Another object of the invention is to provide an improved valve of the type indicated which will successfully withstand greater back pressures than valves of similar type heretofore used, with which I am familiar, without incurring damage or malfunctioning in any way. In this connection it is an object to provide a resilient valve member in which the inlet section is reinforced radially by the tubing or casing in which the valve is mounted in such a manner that when in use the valve is protected against collapsing or breaking under unduly high back pressures.

Another object is to provide a valve of the type indicated in which improved means are provided for mounting the resilient valve member in a non-resilient casing or housing and providing an improved seal between the parts.

A further object of the invention is to provide an elastic or resilient valve member adapted to expand for permitting flow of fluid from the inlet to the outlet ends of the device which is constructed to minimize the possibility of the member splitting when expanded under the influence of the fluid flowing through it.

These and other objects will be apparent from the drawing and the following description thereof.

Referring to the drawing, which is for illustrative purposes only:

Figure 1:
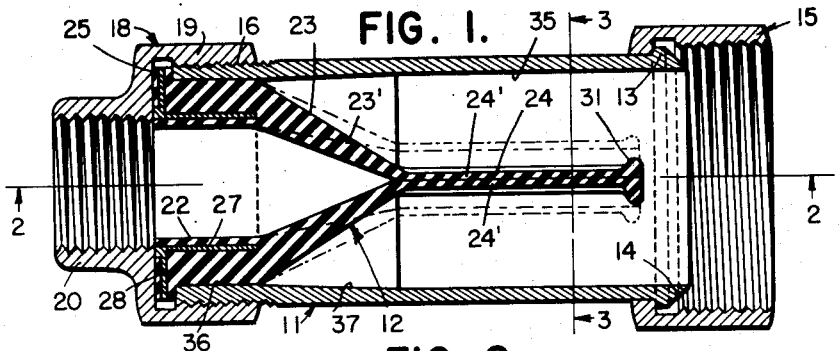
Fig. 1 is a longitudinal sectional view through a device embodying the invention.

More particularly describing the invention, reference numeral 11 generally indicates a tube, barrel, or pipe section which forms part of a housing or casing means for a flexible valve member which is generally indicated by numeral 12. The member 11 is generally cylindrical and at the outlet end is provided with a peripheral flange 13 and a seat 14. The purpose of the flange 13 is to form an abutment for a collar indicated by 15 which may form part of a union fitting.

The inlet end of the member 11 is provided with an external thread 16 and thereby adapted to receive a bell fitting 18 which has an enlarged portion 19 threadedly mounted on the member 11 and a reduced internally threaded extension 20.

As previously indicated, the valve includes as the major working part thereof a flexible valve member 12 which is elastic or resilient and preferably made of a rubber-like material. The material may vary depending upon the use to which the valve is to be put, the material being chosen so that the fluid to be carried will not have a deleterious effect upon it.

Valve member 12 comprises an inlet section 22 which is relatively thick walled, a tapered intermediate section 23, and a flat outlet section 24. The inlet section is generally cylindrical and is provided with a peripheral flange 25 which is received between the end of member 11 and the fitting 18. Preferably the inlet section is reinforced, and the reinforcement means may take the form of a cylindrical metal tube 27 and an annular plate-like element 28. These reinforcing parts are embedded in the inlet section at the time of manufacture.

The intermediate section 23 of the valve is provided with converging walls 23' of decreasing thickness, and these terminate in two relatively thin walls 24' which are flat and normally lie juxtaposed in contact, forming the outlet section 24. The outlet section is preferably reinforced at the margins by the longitudinal beads or ribs 30 and a lateral end bead 31.

Figure 2:
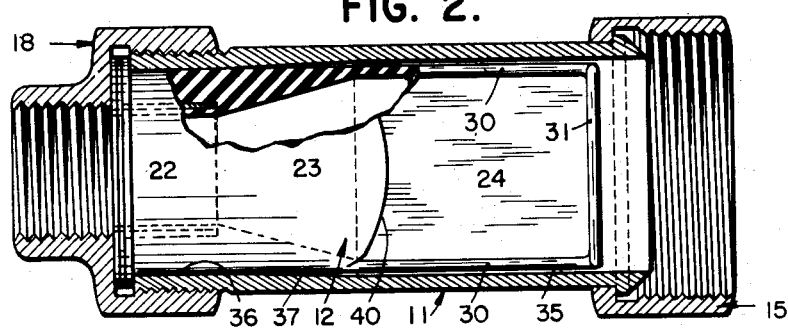
Fig. 2 is a sectional view on line 2—2 of Fig. 1 but with the valve element shown largely in elevation and only partly broken away.
Figure 3:
Fig. 3 is a cross section on line 3—3 of Fig. 1.
Figure 3A:
Fig. 3a is a view similar to Fig. 3 but with the valve member expanded.

In the drawings, Figs. 1-3, the valve member 12 is shown in its normal position, that is, when the pressure on opposite sides of it is the same. It will be apparent that when the pressure on the inlet side of the valve member exceeds that on the outlet side the intermediate and outlet sections of the valve expand to form a conduit for the passage of fluid therethrough. Fig. 3a is illustrative of the cross-sectional shape of the outlet end of the valve member when fluid is flowing through it. The broken lines on Fig. 1 also show this.

Figure 5:
Fig. 5 is a view similar to Fig. 4 but with the valve open.
Figure 4:
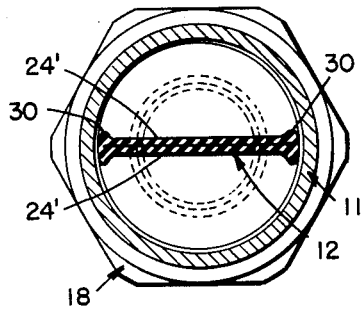
Fig. 4 is a detail enlarged fragmentary sectional view of one side portion of the resilient valve member with the valve closed.
Figure 4:
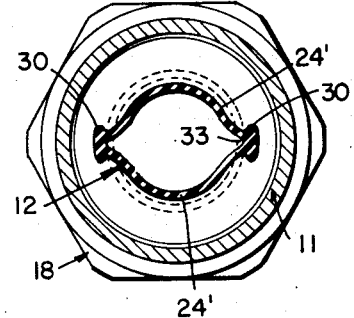
Figure 4:
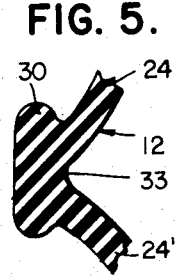

It is a particular feature of the invention that the outlet end of valve member 12 is so constructed that when it is expanded by the flow of fluid therethrough it will not be subjected to splitting open at the sides in the region of the ribs 30. As shown in Figs. 4 and 5, the inside of the outlet end of the valve member at each side is formed with a slight radius 33 which serves to prevent splitting of the rubber or other flexible material when the valve is expanded.

Preferably, the tubular element 11 of the valve housing or casing is enlarged at 35 in the region of the outlet end 24 thereof in order to provide ample room for the closing of the outlet end of the valve. However, the inlet section 22 of the valve member fits relatively closely within a cylindrical bore 36 in the member 11. The inside of the member 11 may taper in the region 37 between the sections 35 and 36.

With the construction described it will be apparent that when the pressure in the pipe line in which the valve is mounted is greater on the outlet side of the valve member than on the inlet side, the valve will remain closed and will assume the position in which it is shown in Fig. 1 unless the pressure on the outlet side greatly exceeds the pressure on the inlet side in which event the intermediate section 23 of the valve will collapse partially and progressively from the outlet end toward the inlet end. This action coupled with the excess pressure on the outlet side serves to axially compress the inlet section 22 of the valve tending to expand it radially. The section is reinforced internally by the reinforcement means 27, 28 and externally by abutment with the surface 36 of the tubular member 11. I have found that this construction greatly increases the life of the valve member and renders the valve member capable of operating successfully under extremely high differentials of pressure where the outlet pressure exceeds the inlet pressure without danger of too great collapse or breakage of the valve.

Preferably, the intermediate section 23 of the valve terminates on each side at its outlet end in a curved shape or radius which is indicated by numeral 40 and best shown in Fig. 2. With this construction an effective seal is maintained in this region under all conditions where the inlet pressure does not exceed the outlet pressure.

Figure 7:
Fig. 7 is an enlarged section on line 7—7 of Fig. 6.
Figure 6:
Fig. 6 is a top plan view of another form of valve member.
Figure 6:
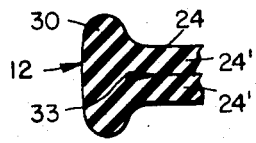
Figure 6:
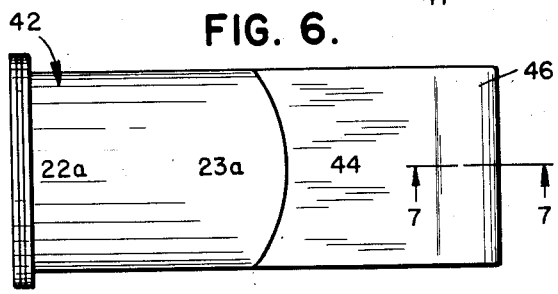

In Figs. 6 and 7 there is shown another form of valve member indicated by numeral 42. The valve member is shown in top plan view. The inlet section 22a and intermediate section 23a are the same as those of the valve previously described. The outlet section, indicated by 44, is made flat without the marginal reinforcing ribs. The outer end of the upper wall 45 of the outlet section is provided with a thick bead 46 which serves to weigh down the end as shown in Fig. 7 to effect a seal in the region 44 when the pressure inside the valve member does not exceed the pressure outside of it. The bead seems to slightly weigh down the lip of the valve to effect the seal mentioned.

Although a particular embodiment of the invention has been shown and described, it is contemplated that various changes and modifications can be made without departing from the scope of the invention as defined in the accompanying claim.

I claim:

A check valve member comprising a resilient, tubular body having a thick walled cylindrical inlet end portion, a tapered, intermediate section having a wall tapering in thickness, and a flat outlet end portion in the form of a pair of relatively thin walls normally lying flat in contact with each other, said walls being secured at their sides and being free to expand to form a longitudinal passageway through said valve member, said valve member being secured so that the flat walls of the outlet portion lie in a horizontal plane, the upper wall only having a bead extending transversely across the terminal end thereof so as to weight down the terminal end of the upper wall and bias said end toward sealing contact with the terminal end of the lower wall.

CUT KRAVAGNA.

References Cited in the file of this patent

UNITED STATES PATENTS

| Number | Name | Date |
|---|---|---|
| 679,519 | Smith | July 30, 1901 |
| 1,576,331 | Kelley | Mar. 9, 1926 |
| 1,930,107 | Rang | Oct. 10, 1933 |
| 2,098,885 | Safford | Nov. 9, 1937 |
| 2,275,937 | Baker | Mar. 10, 1942 |
| 2,352,642 | Langdon | July 4, 1944 |
| 2,382,427 | Langdon | Aug. 14, 1945 |
| 2,576,192 | Pozink | Nov. 27, 1951 |